United States Patent [19]
Grott

[11] Patent Number: 6,071,411
[45] Date of Patent: Jun. 6, 2000

[54] METHOD OF TREATING SOIL FOR CONTROLLING DUST AND FOR EFFECTING SOIL STABILIZATION THROUGH THE APPLICATION OF WASTE WATER

[76] Inventor: Gerald J. Grott, 16220 N. 7$^{th}$ St. Unit 1151-47, Phoenix, Ariz. 85022

[21] Appl. No.: 09/110,789

[22] Filed: Jul. 6, 1998

[51] Int. Cl.$^7$ .............................. B01D 15/04; C02F 1/42
[52] U.S. Cl. ..................... 210/638; 210/634; 210/642; 210/660; 210/687; 405/15; 405/258
[58] Field of Search ..................... 210/638, 642, 210/650, 651, 660, 687, 664; 405/15, 258, 264

[56] References Cited

U.S. PATENT DOCUMENTS

| | | |
|---|---|---|
| 2,375,019 | 5/1945 | Miller . |
| 2,387,898 | 10/1945 | Grebe et al. . |
| 2,687,358 | 8/1954 | Allberry et al. . |
| 2,968,572 | 1/1961 | Peeler, Jr. . |
| 3,077,054 | 2/1963 | Niemeijer . |
| 3,224,867 | 12/1965 | Milloch . |
| 3,490,241 | 1/1970 | Kuhn . |
| 4,161,446 | 7/1979 | Coillet . |
| 4,422,940 | 12/1983 | Cousino et al. . |
| 4,523,998 | 6/1985 | Kim . |
| 4,592,931 | 6/1986 | Cargle . |
| 4,828,726 | 5/1989 | Himes et al. . |
| 5,125,770 | 6/1992 | Hesseling et al. . |
| 5,300,123 | 4/1994 | Grott . |

Primary Examiner—W. L. Walker
Assistant Examiner—Michael Fleming
Attorney, Agent, or Firm—Drummond & Duckworth

[57] ABSTRACT

The invention relates to a method of stabilizing soil and controlling dust from soil. The invention also relates to disposing of unwanted waste waters produced in purifying water. The method of the present invention includes applying waste water containing 0.15% by weight of the salts of NaCl, CaCl$_2$, MgCl$_2$ and mixtures thereof to soil to control dust and effect soil stabilization.

5 Claims, 4 Drawing Sheets

METHOD OF TREATING SOIL FOR CONTROLLING DUST AND FOR EFFECTING SOIL STABILIZATION THROUGH THE APPLICATION OF WASTE WATER

BACKGROUND OF THE INVENTION

In a first respect, the invention relates to methods for controlling dust and effecting soil stabilization. In a second respect, the present invention relates to the disposal of waste water.

Wind erosion of soil is a significant problem throughout the world. Due to small particle size and poor cohesion, finely divided soil is sensitive to the influence of wind. Such finely divided soil is found in agricultural lands, dunes, lake beds, construction sites and roads under construction. Erosion by wind causes the drifting of masses of soil in the form of dust. The erosion by wind causes the inconvenience of dust formation and the loss of valuable matter such as seed, fertilizer and plantlets. Dust storms are a danger to traffic and a health risk to persons residing in the vicinity.

Moreover, the effects of wind erosion on soil can be enhanced by the influence of the sun and rain. The sun causes the evaporation of moisture from soil thereby reducing the cohesion of finely divided soil. Erosion of the soil by rain is caused by rain washing away soil. This is a particular problem when agricultural soil is washed away, damaging plant life and making the soil unusable for agricultural purposes. Further, due to the influence of erosion by rain, the unprotected slopes of ditches, channels, dunes and roads may collapse or be washed away.

Therefore, it is extremely important to prevent the effects of the sun, wind and water in eroding soil. It has been proposed to prevent the shift, drift and erosion of soil by treating the surface layers of the soil with water dispersible high polymeric substances of a natural or synthetic nature. Examples of these high polymeric substances include starch ethers, hydrolyze polyacrylonitril, polyvinyl alcohol and carboxymethyl cellulose. U.S. Pat. No. 3,077,054 discloses the use of polyvinyl acetate as an anti-erosion agent. U.S. Pat. No. 3,224,867 teaches the conditioning of soil with mono starch phosphate. U.S. Pat. No. 5,125,770 teaches treating the soil with a pre-gelatinized starch and a surfactant compound. Furthermore, it has been known to treat dirt roads with relatively pure solid sodium chloride (NaCl), calcium chloride ($CaCl_2$), and mixtures of the two.

There are several drawbacks with the aforementioned soil treating compounds. The polymers mentioned have a relatively high price and have potentially harmful environmental properties. In addition, the starch ethers have proved sensitive to washing out by rain water. As a result, their effectiveness as an anti-erosion agent is severely limited.

Furthermore, it would be highly desirable to provide a method for treating soil that is of low cost and utilizes a material or compound which is readily available.

Accordingly, it would be highly desirable to provide a method for treating soil to control dust and effect soil stabilization. As used herein, soil stabilization refers to the treatment of soils with chemicals to offset the tendencies of soils to be sensitive to small changes in the types of ions in the soil moisture as they effect the plasticity of the soil. For example, swelled clays, those with layers of "bound" water molecules, are more susceptible to movement under load. Soil stabilization of swelled clays can be effected by altering the types and/or amounts of ions in the soil mixture.

An additional problem encountered throughout the world involves the disposal of waste water. The softening of hard water by the removal of calcium and magnesium is required for both industrial and household use. Known water softening processes proceed either by way of ion-exchange, membrane softening or precipitation. In the ion-exchange processes, the calcium ($Ca^{2+}$) and magnesium ($Mg^{2+}$) ions are exchanged for sodium ($Na^+$) and regeneration of the ion-exchange resin is achieved with a large excess of NaCl. This process creates a regeneration effluent being a relatively concentrated aqueous solution of sodium, calcium and magnesium chlorides which has to be discarded. Consequently, by this method, considerable amounts of sodium, calcium and magnesium salts in solution must be disposed of.

Alternatively, it is possible to use weak acid resins which exchange hydrogen ($H^+$) for calcium ($Ca^{2+}$,) and magnesium ($Mg^{2-}$), and to regenerate the spent resins with a mineral acid. While this method creates less waste water, it is more expensive and yields relatively acidic soft water which is corrosive. Meanwhile, membrane softening concentrates the calcium, magnesium salts and salts of other divalent ions to produce waste waters which require costly disposal.

The precipitation process has traditionally been carried out by the "lime soda" process in which lime is added to hard water to convert water soluble calcium bicarbonate into water insoluble calcium carbonate. This process also results in waste water which is difficult to filter and requires cumbersome treatment.

My previously issued patent, U.S. Pat. No. 5,300,123 (which is incorporated herein by reference), relates to the purification of impure solid salts. Even this process produces salty waste water which must be disposed of.

The disposal of waste water has become an expensive problem for society. For example, approximately 1.61 billion gallons of waste water containing approximately 800,000 tons of mixed sodium, calcium and magnesium chlorides and sulfates is produced from water treatment operations and oil fields in the State of California alone. This waste water must be disposed of, costing millions of dollars.

Accordingly, it would be highly advantageous to provide an improved method of disposing of salty waste waters. It would even be more advantageous to provide a method of disposing of salty waste waters which provides a benefit to society. It would be even more advantageous if salty waste waters could be used to treat soil to control dust and effect soil stabilization.

SUMMARY OF THE INVENTION

Briefly, in accordance with the invention, I provide a method of treating soil for minimizing dust from soil and effecting soil stabilization. I have learned that by applying the waste water from water purification and water softening processes upon soil provides an excellent means for controlling dust from wind blown soil and for effecting soil stabilization. More particularly, I have learned that the direct application of the salty waste waters from water purification and water softening processes are effective in treating industrial clays; controlling dust; stabilizing load bearing soils such as foundations, road beds, etc.

The waste waters of the present invention are any waters which are produced as a result of the purification of water which results in a first effluent of clean water and a second effluent of a waste water, which typically must be disposed of. As defined herein, clean water refers to water which has been treated by one or several methods for public or industrial use. For example, in the drinking water industry, clean water is the final delivered water. Typical water purification processes and water softening processes of the present invention include reverse osmosis, electro dialysis, distillation, evaporation, ion exchange and lime softening. These processes create waste water having various levels of salt content. For the purposes of this invention, I define "waste water" as water containing about 0.15% or more by weight of the salts of NaCl, $CaCl_2$, $MgCl_2$, or a combination thereof. Prior to the practice of my invention, the waste water from any of these processes was expensive to dispose of.

The waste water may be applied to the soil by any means commonly known in the art. For example, the waste water may be applied by spraying from the back of a truck or other type of construction or farm equipment. In addition, the waste water may be applied to the soil by slow moving aircraft.

Accordingly, it is a principal object of the invention to provide new methods for stabilizing soil and controlling dust from soil.

It is another object of the invention to provide a cost effective means of disposing of waste water produced from the purification of water.

These and other, further and more specific objects and advantages of the invention will be apparent to those skilled in the art from the following detailed description taken in conjunction with the drawing.

DETAILED DESCRIPTION OF THE PREFERRED EMBODIMENTS

Figure 1:
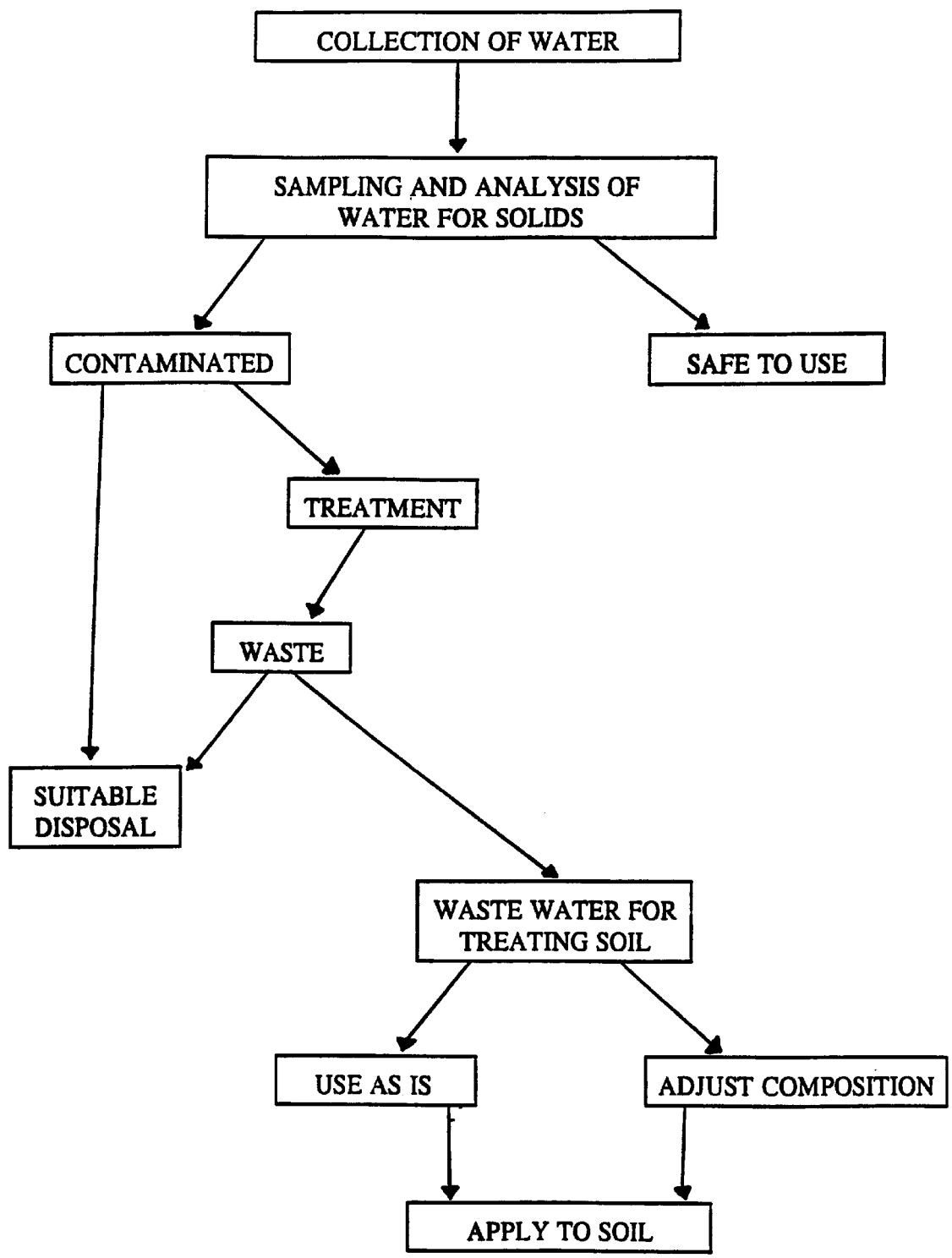
FIG. 1 is a flow chart of the preferred method of the invention.

While the present invention is susceptible of embodiment in various forms, as shown in the drawing, hereinafter will be described the presently preferred embodiments of the invention with the understanding that the present disclosure is to be considered as an exemplification of the invention and it is not intended to limit the invention to the specific embodiments illustrated.

Water softening is the removal of the "hardness" from the water which means predominantly removing or altering the calcium and magnesium ions from the water. These calcium and magnesium ions combined with carbonates, sulfates, oils and fat to create bathtub scum, spotted dishes, gray sheets, etc. In addition, unsoftened water has been found to cause scaling of industrial water heaters and commercial boilers causing early substantial energy losses through impaired heat transfer and early shutdown for the removal of scale. Several methods for effecting water softening are known. The best known process for softening water is "ion-exchange". Ion-exchange entails the exchange of sodium, which is introduced into water, for calcium, magnesium, iron and other divalent mineral ions which are transferred out of the water and into a resin. When the resin approaches saturation with these hard ions, the resin is regenerated most often with solutions of sodium chloride leaving an effluent containing 3 to 25% sodium, calcium and magnesium salts which must be disposed of. The exact concentration of the effluent depends on the shop practice and, in particular, on the amount of rinse water included in the effluent, if any. Less often mineral acids like sulfuric or hydrochloric acid is used for water softening and these also produce effluents.

Membrane systems have recently become economically feasible. These systems, such as electro dialysis and reverse osmosis, include the use of a membrane which also produces a salty effluent. For critical uses such as electronics, and particularly for use in the manufacture of computer chips, the first product of clean water may be further purified by dual bed or mixed bed ion-exchange treatment. This "polishing treatment" also produces an effluent containing the removed salts.

Each of these water purifying processes produce a clean water effluent and a waste water effluent which is expensive and difficult to dispose of. Moreover, in U.S. Pat. No. 5,300,123, I disclose a method for reducing the soluble and insoluble impurity levels in salt. In the practice of this invention, salt crystals are initially reduced in size by fine grinding the crystal mass. The crystal mass is then added to a substantially saturated solution of salt and the strain induced in fine grinding process causes them to dissolve in the substantially saturated solution to the extent that the solution becomes supersaturated and new purified crystals form and grow. This dissolving and reforming is continued until substantially all of the original finely ground particles of salt have dissolved and reformed as new purified crystals. The new purified crystals are separated by size from the solution and rinsed, while the fine insoluble impurities which do not grow appreciably, if at all, remain in the now impure solution of sodium, calcium and magnesium chlorides, along with minor impurities from the original waste salt.

I have learned that the waste water produced from water purification and water softening processes, and the calcium and magnesium substantially saturated solution produced in practicing my invention disclosed in U.S. Pat. No. 5,300,123, can be effectively used as soil amendments to control dust and effect soil stabilization. The chemical and physical properties of clays and soils have ion-exchange properties which are determined in great part by their contact with water soluble chemicals. Chemicals having particular influence on the physical properties of soil are sodium, potassium, calcium and magnesium because these are common cations. The most common anions found in soils are chloride, sulfate, carbonate and bicarbonate. The concentration, and relative concentration, of the various dissolved ions determine the activity of the exchangeable ions attached to soil particles. Thus, it is possible to alter and regulate the behavior of soils by controlling the ratio and amount of the various ions applied to the soils.

More particularly, I have found that sodium chlorides have much greater effectiveness in stabilizing soils than the calcium and magnesium salts. Conversely, I have found that the calcium and magnesium chlorides have much greater effectiveness in controlling dust from wind blown soil than sodium salts. I have also found that, in general, the calcium and magnesium salts do not noticeably interfere with the sodium chloride's ability to stabilize soils, while the sodium salts do not reduce the effectiveness of calcium and magnesium chlorides for dust control.

For the purposes of this invention, "waste water" is defined as any water containing sufficient salts as to have no acceptable use due to costs or contamination levels. In general, waste water containing about 0.15% or more by weight of the salts of NaCl, $CaCl_2$, $MgCl_2$, or combinations thereof are considered as having no acceptable use and must be disposed of.

With reference to FIG. 1, in a preferred embodiment, water is collected which is contaminated with salts including NaCl, $CaCl_2$ and $MgCl_2$. The contaminated water is purified by any means known to those skilled in the art, including distillation, reverse osmosis, electrolysis, evaporation, ion exchange, etc. The contaminated water is processed to produce a first effluent of relatively clean water which is useful for agricultural purposes, drinking water, industrial purposes, etc. The processing also produces a second effluent of waste water. The waste water is analyzed for hazardous materials to confirm that the waste water is safe to use. Thereafter, the waste water, comprising a solution of salts, is analyzed for individual amounts of sodium, calcium, and magnesium and total dissolved solids to determine the best application and the amount of solution to be applied to a particular soil. The waste water is then applied to soil by spraying from a truck, aircraft or the like to effectively control dust and stabilize the soil. Where the concentration of salts is not enough to meet the required needs in a single application, several applications of the waste water may be employed.

Figure 2:
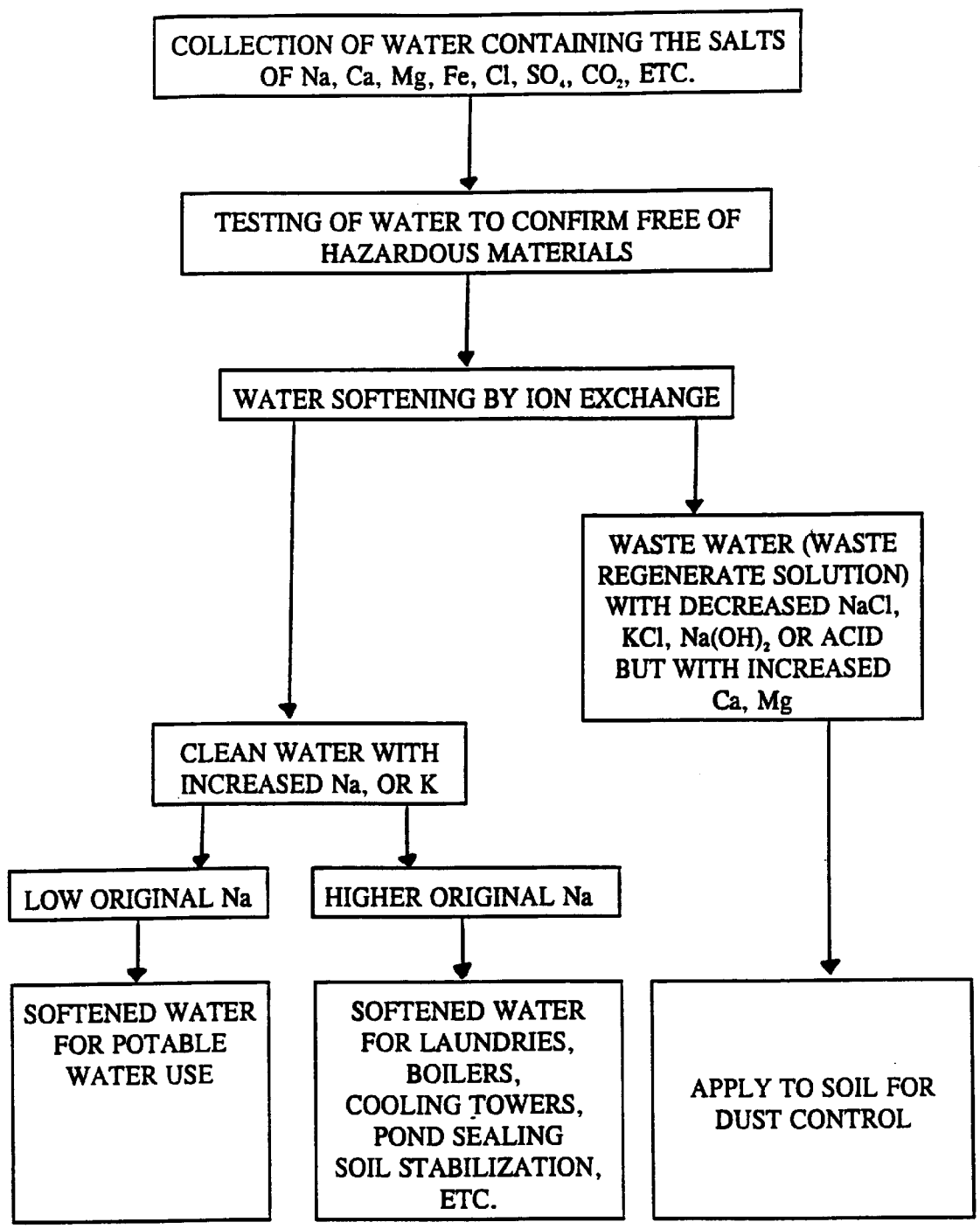
FIG. 2 is a flow chart of another preferred method of the invention.

With reference to FIG. 2, in a second preferred embodiment, water is collected which is contaminated with the salts of Na, Ca, Mg, Fe, Cl, SO4, CO2, etc. The water is then tested to confirm that it is free of hazardous materials. The contaminated water is then purified by ion exchange. As the name implies, the amount of salts in the effluents does not change. However, the cations exchange for anions. By this process, a first effluent of clean water is produced having an increase in sodium or potassium. Where the contaminated water originally contained a low amount of sodium, it is preferred that this water be used for potable water. Meanwhile, where the contaminated water originally contained high sodium amounts, it is preferred that the clean water effluent be used for laundries, boilers, cooling towers, pond sealing and soil stabilization. These uses are listed in order of suitability as the sodium increases. As shown in FIG. 2, the water softening process by ion exchange also produces a waste water having decreased NaCl, KCl, $Na(OH)_2$ or acid, but having an increase in calcium and magnesium. This waste water is then applied to soil by spraying from a truck, aircraft or the like to control dust.

Figure 3:
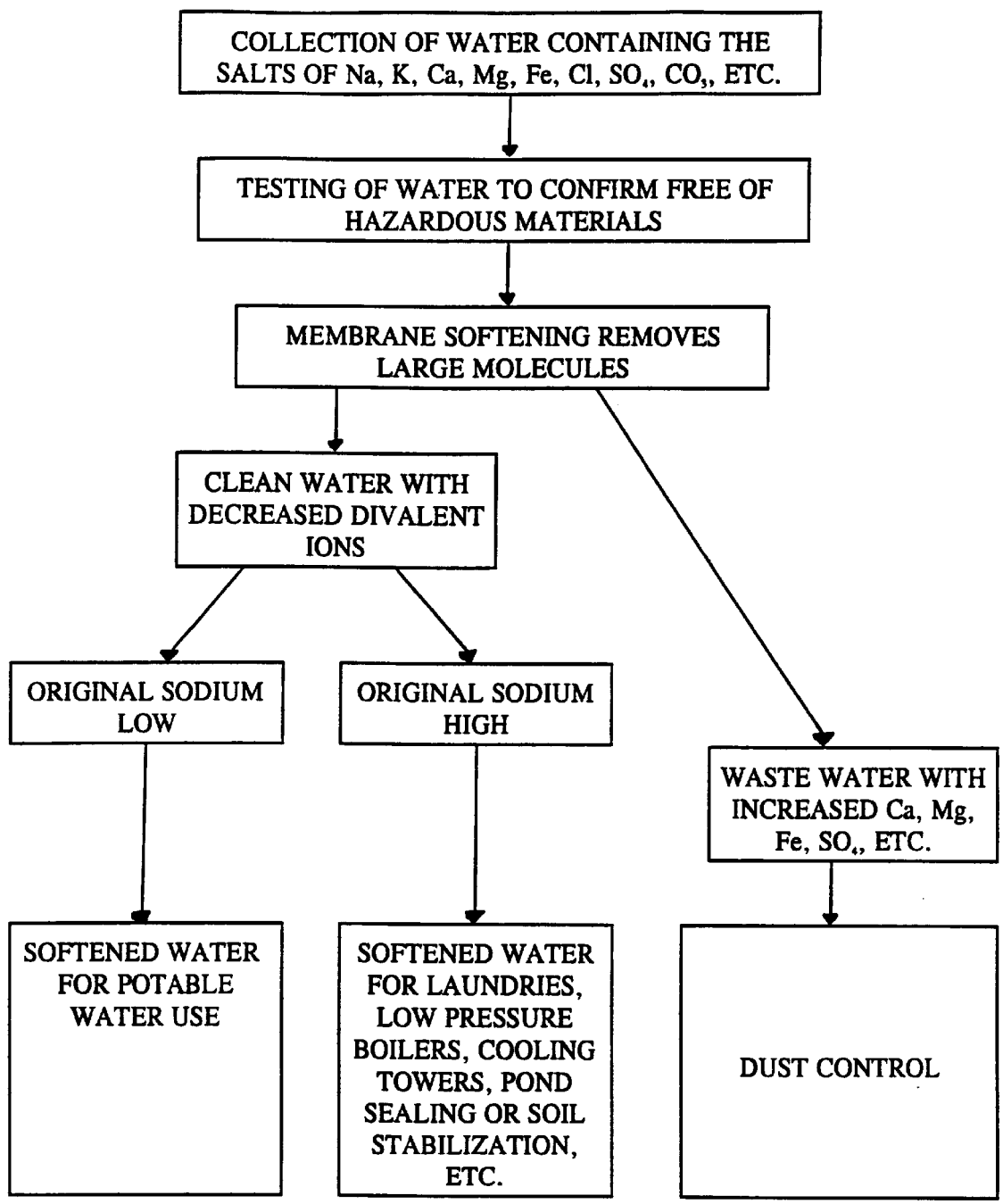
FIG. 3 is a flow chart of still another preferred method of the invention.

With reference to FIG. 3, in a fourth preferred embodiment, water is collected which is contaminated with the salts of Na, K, Ca, Mg, Fe, Cl, SO4, and $CO_3$. The water is then tested to confirm that it is free of hazardous materials. This contaminated water is then purified by a membrane system to remove large molecules. A first effluent of clean water having decreased divalent ions is produced from the membrane softening process. Where the original sodium content of the contaminated water is relatively low, it is preferred that the clean water be used for potable water. Where the original sodium content of the contaminated water is relatively high, it is preferred that the clean water effluent be used for laundries, low pressure boilers, cooling towers, pond sealing and soil stabilization. The membrane system also creates a waste water having increased calcium, magnesium, iron, sulfates, etc. It is preferred that this waste water be applied to soil by spraying from a truck, aircraft, or the like to effectively control dust.

Figure 4:
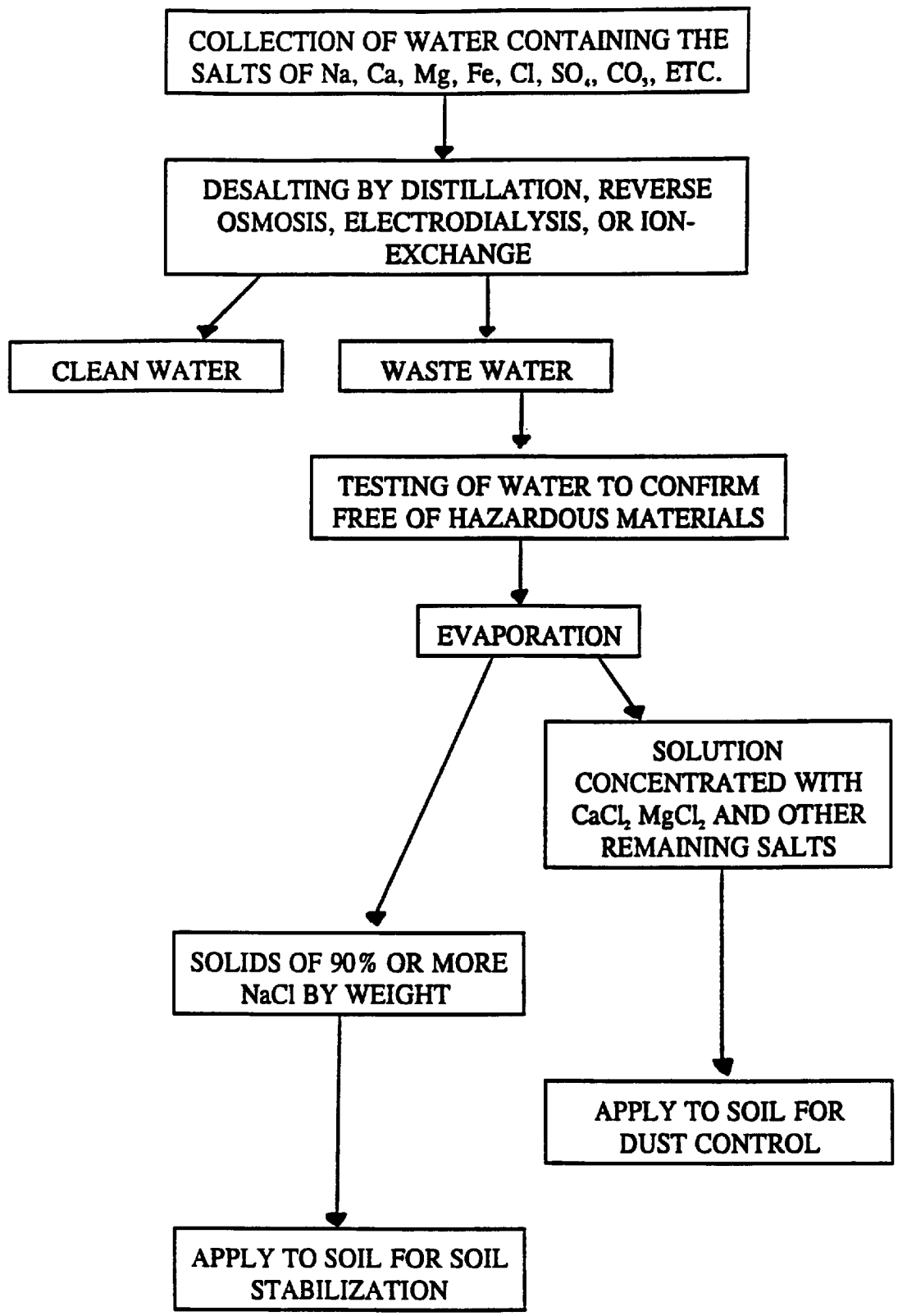
FIG. 4 is a flow chart of a preferred method of the present invention including evaporation to produce substantially solid sodium chloride.

As shown in FIG. 4, in a fourth embodiment of my invention, water contaminated with the salts of NaCl, $CaCl_2$ and/or $MgCl_2$ is collected. The contaminated water is desalted to produce a first effluent of relatively clean water, and a second effluent of waste water. The second effluent undergoes further evaporization processing to produce a first product of 90% or more NaCl, and a third effluent solution of substantially saturated $CaCl_2$, and $MgCl_2$. The NaCl is then applied to soil to effect soil stabilization. Meanwhile the third effluent solution of mixed $CaCl_2$ and $MgCl_2$ is applied to soil to effect dust control.

As would be understood by those skilled in the art, the preferred amount of water and the percentage of salts contained therein to control dust and effect soil stabilization will vary greatly. Factors which will effect waste water applications include the chemical composition of the soil, the moisture in the soil, humidity, local rainfall, traffic conditions, etc.

Since the testing of soil is expensive, it is preferred that the waste water be applied in several applications. Waste water is applied and allowed to evaporate. The soil is examined to determine if sufficient waste water has been applied to control dust or stabilize the soil. These steps are repeated until sufficient salts have been applied to control dust or to stabilize the soil.

The invention will now be further explained in and by the following examples.

EXAMPLE 1

Approximately 2.7 miles of road in the Mojave Desert of California is treated with waste water containing approximately 12.5% total salts, and in particular, about 1.37% calcium chloride, 0.39% magnesium chloride and 10.7% sodium chloride. After treatment, the road underwent periodic truck traffic. Visual comparison of dust produced by truck traffic is measured against a section of road which has not been treated. Following a rain, dust starts to be visible from a one mile distance within 2–4 days for the untreated road, while dust starts to be visible from the one mile distance within 10–20 days for the treated section of road.

Thereafter, waste water applications are increased for a three month period. The amount per application is the maximum that the soil will absorb without turning muddy. Then, the applications are ceased. The road is examined over the next year and found not to exhibit any significant dusting. In addition, there is a distinct reduction of washboarding.

EXAMPLE 2

Approximately one mile of dirt road in the Mojave Desert is treated with a mixture of sodium, calcium and magnesium salts. Application of the untreated waste water proves effective for effecting soil stabilization. Compared to untreated sections of the dirt road, the soil is found to be more stable and less prone to being spread by rainfall, and is found to be much less prone to washboarding and potholing.

Having described the invention in such terms as to enable one skilled in the art to make and use it and having identified the presently best mode of practicing it, I claim:

1. A method of treating soil to control dust and effect soil stabilization including the steps of:

collecting waste water containing 0.15% or more by weight of the salts of NaCl, CaCl$_2$, MgCl$_2$ or a combination thereof, the waste water being produced as a result of water purification of contaminated water which results in a first effluent of substantially clean water and a second effluent of waste water; and applying the waste water to soil to control erosion and effect soil stabilization.

2. The method of treating soil to control dust and effect soil stabilization of claim 1 further comprising:

processing contaminated water to produce a first effluent of clean water, and a second effluent of waste water.

3. The method of treating soil to control dust and effect soil stabilization of claim 2 wherein the step of processing contaminated water is accomplished by a water softening process.

4. The method of treating soil to control dust and effect soil stabilization of claim 3 wherein the water softening process is ion-exchange, precipitation, membrane softening, or electrolysis.

5. The method of treating soil to control dust and effect soil stabilization of claim 2 wherein the step of processing contaminated water is accomplished by a desalting process.

* * * * *